Oct. 27, 1970 KIYOSHI INOUE 3,536,881
CONSTANT CURRENT DENSITY EDM SYSTEM CAPABLE OF AUTOMATICALLY
RESPONDING TO CHANGING MACHINING AREA
Filed Sept. 25, 1968 3 Sheets-Sheet 1

INVENTOR.
KIYOSHI INOUE
BY
Karl F. Ross
ATTORNEY

FIG. 2-A

United States Patent Office 3,536,881
Patented Oct. 27, 1970

3,536,881
CONSTANT CURRENT DENSITY EDM SYSTEM CAPABLE OF AUTOMATICALLY RESPONDING TO CHANGING MACHINING AREA
Kiyoshi Inoue, Tokyo, Japan
(100 Sakato, Kawasaki, Kanagawa, Japan)
Continuation-in-part of application Ser. No. 682,824, Nov. 14, 1967, which is a continuation-in-part of application Ser. No. 493,473, Oct. 6, 1965, now Patent No. 3,360,683. This application Sept. 25, 1968, Ser. No. 762,580
Claims priority, application Japan, Oct. 21, 1967, 42/67,723; Nov. 27, 1967, 42/76,040
Int. Cl. B23p 1/04, 1/08
U.S. Cl. 219—69                                   20 Claims

ABSTRACT OF THE DISCLOSURE

Power-supply arrangement for electric-discharge machining apparatus in which impulsive current is applied to an electrode advanced in the direction of a workpiece while a dielectric coolant floods the gap, the circuit having means for controlling the main current delivered to the electrode so as to maintain the current density at the machining surface constant in spite of variations in the workpiece area subjected to electric-discharge machining in the course of the electrode movement.

---

This application is a continuation-in-part of my application Ser. No. 682,824, filed Nov. 14, 1967 as a continuation-in-part of application Ser. No. 493,473 of Oct. 6, 1965 (now U.S. Pat. No. 3,360,683).

My present invention relates to a method of and apparatus for the electric-discharge machining (EDM) of conductive workpieces and, more particularly, to the erosion of material from metallic and other conductive bodies under the impulsive and electroerosive action of electric discharges (e.g. sparks).

In the electrical machining of metallic workpieces, electroerosive currents may remove material from the workpiece by solubilization of an electrolyte (electrochemical machining or ECM) or suspend particles of the workpiece material, removed by relatively high-energy concentrated impulsive-spark discharge, in a dielectric medium by applying spark-producing electrical potentials across the dielectric-fluid gap between an electrode and the workpiece. Such systems use the dielectric at least in part as a coolant and as a medium preventing premature breakdown of the machining gap or as a medium for carrying away the particles of the workpiece material removed by the process. The coolant or dielectric liquid may be kerosene or transformer oil.

In my U.S. Pat. No. 3,054,931, issued Sept. 18, 1962 and entitled "Electric Power Supply Apparatus for Electric-Discharge Machining," I have set forth the basic principles governing electric discharge machining of conductive workpieces and proposed an arrangement for applying electrical pulses across the electrode and the workpiece. Further discussions of these principles and related principles in the field of electrochemical machining have been set out in my application Ser. No. 316,955 of Oct. 17, 1963 (now U.S. Pat. No. 3,357,912) and principles bearing primarily upon the discharge machining are further elucidated in application Ser. No. 475,375, filed July 28, 1965.

In each of these last-mentioned applications, which have maintained a common line of copendency with one another and with the present application, an electrode is advanced relatively to the workpiece by a servomechanism or "servo feed system" designed to maintain an optimum gap spacing between electrode and workpiece.

As pointed out in my application Ser. No. 682,824, it is possible to damage both the electrode and the workpiece by initially feeding the electrode in the direction of the workpiece while applying a substantial power pulse across the gap. Thus this latter application makes provision for a current reduction by concomitantly or separately increasing pulse off-time and decreasing pulse on-time during gap open circuit. When the gap becomes too narrow or is bridged or contaminated by eroded particles, an abnormal condition called "gap short circuit" can arise. The system of application Ser. No. 682,824 effectively controls electrical machining of this character wherein a succession of power pulses is utilized. In the basic system there described, the machining power circuit for supplying pulses to the gap includes a power supply and a periodically operated electronic switch of preset on-off time having its principal electrodes connected in series with the power supply and the gap for supplying the machining pulses thereto. Sensing means connected across the gap provides an electrical output signal responsive to abnormal gap conditions to operate a control means connected with one of the switch electrodes to decrease its on-time in response to the signal. Delay means is coupled between a sensing means and the control means for delaying its operation a predetermined time interval after the occurrence of the abnormal gap condition.

A related application Ser. No. 401,308, filed Oct. 5, 1964 (now U.S. Pat. No. 3,409,753) provides a source of alternating current potential connectable across the gap between an electrode and the workpiece in the presence of the dielectric coolant, rectifier means being connected to the source and between the latter and the gap. Saturable reactor means is interposed between the source and the first rectifier means while the reactor includes a control winding and an energizing circuit whose second rectifier is connected across the control wire in series with a capacitor such that the capacitor and rectifier form a series combination connected across the gap.

One of the problems arising in electric-discharge machining of a metallic workpiece is the problem of changing current density as the working face of the tool electrode is juxtaposed with larger or smaller surfaces of the workpiece whereby the discharge must occur over changing surface areas.

A given total current will provide diminished current density as the working area increases and vice versa. With a constant feed rate, for example, changes in the working surface area vary the current density with reduced performance even when the gap is carefully controlled by means described earlier.

It is, therefore, a principal object of the present invention to provide improved means for carrying out EDM at an optimum rate independent of variations in the surface area exposed to the discharge.

Still another object of this invention is to provide a method of machining workpiece with electric discharge whereby the disadvantages of fluctuating current density are reduced or eliminated.

These objects and other which will become apparent hereinafter are attainable, in accordance with the present invention, by providing an EDM method which maintains the current density substantially constant by providing a current-control circuit responsive to the rate of advance of the tool electrode over a gap-controlling servo for compensatorily varying the current.

The present invention is based on my discovery that, when the position of the tool electrode is adjusted by a servo-mechanism or servo feed means, as described earlier, to maintain a substantially constant optimum machining gap, the rate of change of the feed with time is a function of the change in surface area exposed to the spark discharge along the machining surface. Consequently, a reduced surface area is equivalent to a higher removal rate and a correspondingly higher electrode feed rate, while an increased machining area is equivalent to a slower rate of removal of material and a corresponding decrease in the rate of advance of the electrode.

Consequently, I provide sensing means responsive to the rate of advance of the electrode (e.g., a tachometer coupled with the servomotor or some other rate generator) for indicating the variation in surface area exposed to the machining operation and mean-current control means in the power supply circuit electronically regulated by the rate generator. The mean-current control means may include a source of constant current which is triggered across the electrode and workpiece at a varying rate to maintain the mean current substantially constant, means for controlling the storage level of an electric-energy storage impedance such as a capacitor or inductor and selectively discharging same to obtain the desired mean current, or simply a current-controlling impedance in circuit with the power supply and the electrode gap.

According to a more specific feature of this invention, the tachometer or rate generator output is applied through an electronic sensing circuit in which the rate generator output bucks a reference signal, the difference being used to operate the control winding of a saturable reactor in series with the line source and a rectifier ahead the discharge capacitor generating the impulsive electric current necessary for machining.

According to a further feature of this invention, the current is supplied to the electrodes in the form of a train of current pulses and the current density at the machining surface is maintained substantially constant by detecting the gap width and varying a parameter of the current-pulse train in dependence upon the variation in gap width or the rate of advance of the tool electrode. In order to modify the aforementioned parameter, I may:

(a) Vary the duration of the pulses of the pulse train while maintaining the pulse frequency substantially constant;

(b) Vary the off-time of the pulses of the train while maintaining the pulse frequency substantially constant;

(c) Vary the duration of the pulses of the train while maintaining the off-time of the pulses constant or substantially constant; and (d) Vary the off-time of the pulses of the train while maintaining the duration of the pulses constant or substanially constant.

The above and other objects, features and advantages of the present invention will become more readily apparent from the following description, reference being made to the accompanying drawing in which:

FIG. 2A is a graph showing the pulse train of the circuit of FIG. 2;

As has been observed in the aforementioned patents and pending applications, an EDM apparatus of the type with which the present invention is concerned generally comprises a tool electrode, servocontrol means for feeding the tool electrode toward the workpiece electrode, a circuit for applying an electric pulse across the machining gap to electroerosively and impulsively dislodge minute particles of the workpiece material and means for circulating a dielectric coolant through the gap to carry away the eroded particles and cool the machining surface. The subsequent description, concentrating mainly upon control circuit designed to maintain constant current density, will be understod in each case to include all of these essential elements whether or not they are individually described or mentioned. For example, each system must include the dielectric circulation means even though it may not be me ntioned hereinafter again.

Figure 1:
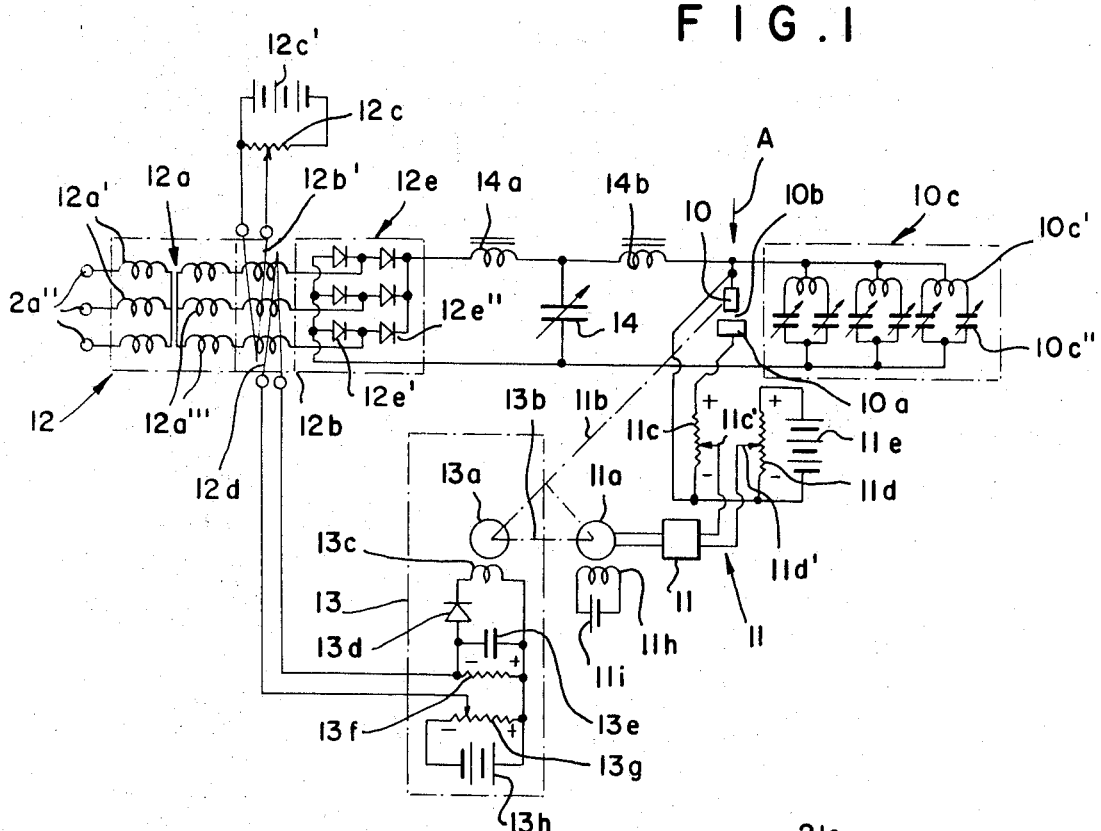
FIG. 1 is a circuit diagram of a power supply system of the present invention for maintaining constant current density and using a saturable reactor to modify mean-current amplitude.

In the system of FIG. 1, I have shown a tool electrode 10 which is juxtaposed with the workpiece 10a across a machining gap 10b and an advance by a servocontrol means represented generally at 11. The servocontrol means includes a servomotor 11a which is connected with the electrode 10 as represented by the dot-dash line 11b. This line is representative of any conventional transmission means, for example, rack and pinion, spindle and spindle-drive etc., capable of displacing the electrode 10 downwardly (arrow A). As described in the copending applications, an electric parameter (e.g. the voltage across the gap) is detected by a voltage divider 11c connected between the tool electrode 10 and the workpiece electrode 10a to develop at its tap 11c' a voltage level which may differ from or may equal the voltage at a tap 11d' of a reference voltage divider potentiometer 11d connected across the battery 11e.

The servosystem further comprises the usual servo-amplifier 11f which is connected across the taps 11c' and 11d' to detect an "error" signal and energize the servomotor 11g whose reference winding 11h is energized by the battery 11i to shift the electrode 10 in the direction of arrow A to nullify the error signal and thereby restore the optimum gap condition. The servomotor and amplifier may be of the type described at pages 44 ff. of Servomechanism Practice, McGraw-Hill, 2nd edition, 1960.

To sustain the discharge and, in effect, produce numerous subdischarges during the course of each major current pulse, I provide a series of parallel-resonant networks, generally represented at 10c and connected in parallel across the gap as has been described in the aforementioned copending applications. The networks each include an inductance 10c' whose center tap is connected to the electrode 10, and a pair of capacitors 10c'', preferably of the adjustable type, connected between the end terminals of each inductance 10c' and the workpiece electrode 10a.

The power supply for the electric-discharge machining of the workpiece 10a is illustrated generally at 12 and may be a mono- or polyphase source including a rectifier bridge or other rectifying means interposed between this source and the electrode arrangement 10, 10a, 10b. In the embodiment of FIG. 1, the source comprises a three-phase transformer 12a, whose primary windings 12a' are connected to the respective line terminals 12a'' of a three-phase distribution network, and whose secondary winding 12a''' is connected in series with a saturable reactor 12b. The saturable reactor 12b has a reference winding 12b' connected across a voltage-dividing potentiometer 12c which, in turn, is bridged across the battery 12c' to supply the usual bias potential to the reactor. In addition, the saturable reactor has a control winding 12d energized by an electronic circuit 13 responsive to the machining area as indicated above for compensatory adjustment of the current delivered to the electrode assembly 10, 10a, 10b.

The output of the saturable reactor 12b is delivered to a full-wave rectifier 12e, each branch of which contains a pair of rectifying diodes 12e' and 12e'' whose positive terminals are tied together to one side of the storage capacitor 14 which delivers the pulses to the gap 10b upon charging of the capacitor to the breakdown voltage of the gap. The negative terminal of the rectifier networks 12e' and 12e'' is tied to the other side of the capacitor 14. A smoothing choke 14a is connected in series with the bridge 12e and the capacitor 14 while a current-reversal blocking choke 14b is connected between this capacitor 14 and the electrode assembly 10, 10a and 10b. The circuit illustrated in FIG. 1, as thus far described, functions as discussed in the aforementioned copending applications to maintain the gap 10b substantially constant while delivering electric discharges to the workpiece 10a, thereby eroding the latter into the dielectric current flooding the gap. A desired current level may be set by appropriate adjustment of the potentiometer 12c.

According to the principles of the present invention, the servomotor 11a (or the electrode 10) is connected to a rate generator, e.g. a tachometer 13a as represented by the linkage 13b to generate an output signal at the winding 13c whose level is a function of the rate of advance of the machining electrode with respect to the workpiece. Suitable rate generators of this type are described at pages 315 ff. of Servomechanism Practice, McGraw-Hill, 2nd edition, 1960. The output winding 13c of the rate generator is connected across an integrating network comprising the rectifier 13d and a capacitor 13e bridged by a load resistance 13f. A comparison or reference voltage is supplied from the tap of a potentiometer 13g connected across the battery 13h. A potential difference proportional to the rate is thus delivered to the control winding 12d of the saturable reactor 12b. Since the rate of advance of the electrode 10, assuming the maintenance of a constant gap width at 10b, is inversely related to the surface area exposed to the discharge, the control winding 12d increases the current delivered to the assembly 10, 10a, 10b as the rate of advance of the electrode falls to maintain a constant current density or vice versa. In this case, the current amplitude is regulated by the control circuit 13.

Figure 2:
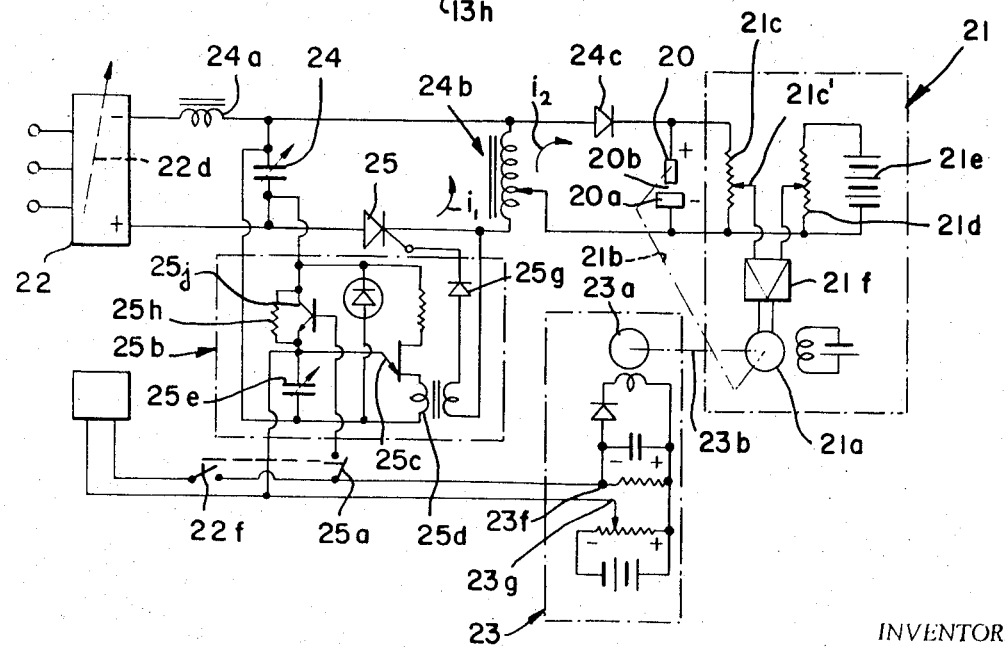
FIG. 2 is a circuit diagram in which the mean current is regulated by the timing of the current pulses.

In the system of FIG. 2, the power supply 22, which is identical to that shown at 12 and can be controlled as represented at 22d, energizes the capacitor 24 via the smoothing choke 24a. In this system, the discharge circuit of the capacitor includes an autotransformer inductance 24b which, upon a discharge current flow as represented by the arrow $i_1$, induces a current flow $i_2$ in the secondary network for energizing the electrode 20 and the workpiece 20a across the gap 20b. A rectifier 24c is connected in series with the electrodes 20, 20a across the output of the autotransformer inductance 24b while the discharge is controlled by a solid-state switch here represented as a solid-state controlled rectifier 25.

In this embodiment as well, the position of the electrode 20 is regulated by a servomechanism 21 analogous to that described in connection with FIG. 1 and comprising a voltage-dividing potentiometer 21c whose tap 21c' is connected to the servoamplifier 21f. The other terminal of this amplifier is energized by the reference voltage of a potentiometer 21d bridged across the battery 21e. The servomotor 21a energized by the servoamplifier 21f, drives the electrode 20 as represented by the dot-dash line 21b.

The rate of advance of the electrode 20 is detected by the rate-generating tachometer circuit 23. This circuit includes a rate generator 23a, connected with the electrode 20 and the servomotor 21a via the linkage 23b and is adapted to develop an error signal across the terminals 23f and 23g as described previously. This error signal can be used, upon the closure of a switch 22f to apply a control signal to the control winding of the saturable reactor of the power supply 22 as previously described. When switch 22f is open and switch 25a is closed, the control output at 23f, 23g can be used to regulate a timing circuit for the controlled rectifier 25, the timing circuit being generally designated at 25b.

In FIG. 2A, I have shown the current I plotted along the ordinate against time $t$ as the abscissa in a pulse-timing diagram. The peak current $I_p$ of each pulse can be established by the control 22d as previously indicated while the pulse width $t_w$ is established by the timing circuit 25b and is compensatorily adjusted to maintain the mean current density constant by increasing the pulse duration as the machining surface increases. The timing circuit includes means for triggering the controlled rectifier 25 with a period T so that the pulse spacing is represented by $T-t_w$.

The timing circuit 25b thus comprises a unijunction transistor or double-base diode 25c whose output electrode is connected to the primary winding of an output transformer 25d, the primary winding being returned to a timing capacitor 25e connected in a relaxation oscillator or unijunction transistor oscillator network to the emitter of the unijunction transistor. The output winding of transformer 25d is connected in series with a rectifier 25g across the gate-cathode terminals of the controlled rectifier. Capacitor 25e is in turn changed through a resistive network including a resistor 25h shunted by the collector-emitter network of a transistor 25j whose base emitter network is connected to the terminals 23f, 23g, the capacitor 24 will discharge with the period T to effect machining of the workpiece 20a. The electrode 20 is advanced by the servomotor 21a in the manner previously described and develops an output at 23f, 23g upon the variation in the rate of advance in the electrode 20 which adjusts the resistance in series with the capacitor 25e to increase the pulse width or decrease the pulse width to maintain the mean current density substantially constant.

Figure 3:
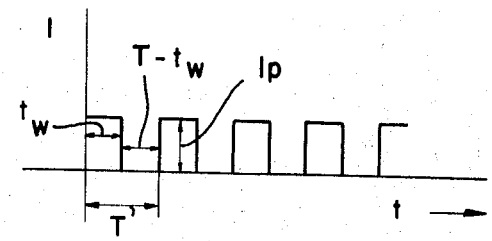
FIG. 3 is another system operating in accordance with the principle of the circuit of FIG. 2.
Figure 3:
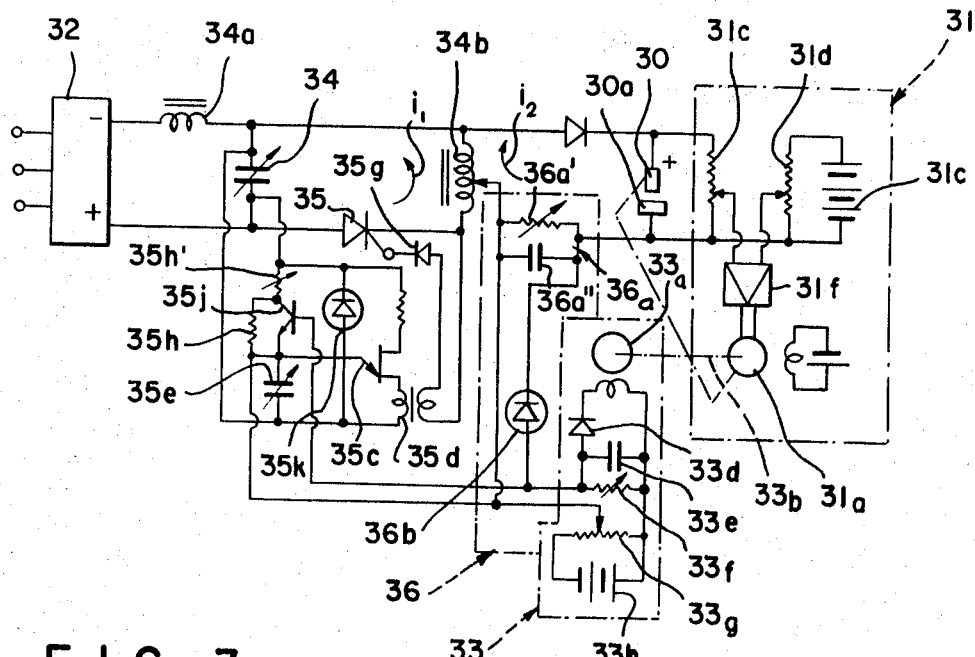

FIG. 3 shows a system analgous to that of FIG. 2 but provided with means (generally represented at 36) for detecting the peak current and comparing this current with the output of the tachometer to maintain the current density substantially constant. In this system, the power supply 32 (identical to that shown at 12 in FIG. 1 and controllable as described in connection with the circuitry 22, 22d and 22f in FIG. 2) energizes the capacitor 34 via a choke 34a, the capacitor 34 being discharged through the controlled rectifier 35 and the autotransformer inductance 34b as previously described. Here again, the gate of the controlled rectifier is operated by the secondary winding of a transformer 35d in series with a rectifier 35g while the transformer 35d is energized by a unijunction transistor 35c controlled by a capacitor 35e connected in series with the adjustable resistor 35h', and the high ohmic resistance 35h which is shunted by the emitter-collector terminals of a transistor 35j. A protective breakdown diode 35k bridges the network 35h', 35h, 35j and35e. The resistance of the transistor 35j is controlled by the ouput of the sensing circuit 33 whose rate generator 33a is connected via a linkage 33b with the servomotor 31a of servomechanism 31. Here again, the servomechanism includes a voltage-detecting potentiometer 31c connected across the gap between the tool electrode 30 and the workpiece electrode 30a to energize the servoamplifier 31f in conjunction with a reference potential from the potentiometer 31d bridge across the battery 31e.

As described in connection with FIG. 1, the rate-generating circuit includes an integrator formed by the diode 33d and a capacitor 33e shunted by the load resistor 33f forming one terminal of the rate-generator output. The other terminal of this output is constituted by the potentiometer 33g connected across the battery 33h.

According to the principles of the invention illustrated by this embodiment, a current detector 36 is provided in the machining circuit and bucks the rate generator output so that the pulse-duration increase cannot exceed the increase necessary to maintain constant current density. It will be noted that, when the circuitry 22d, 22f is provided in this embodiment, the discharge-current detector also controls the amplitude of the current delivered to the electrode. The detector comprises a time-constant network 36a including a low-ohmic resistor 36a' in series with the output of the autotransformer 34b and the electrode system 30, 30a but shunted by the capacitor 36a''. The latter is connected in series with the breakdown diode 36b across the output 33f and 33g of the rate-generating network. Aside from the distinctions already noted, the system of FIG. 3 operates as described in connection with FIG. 2.

As pointed out earlier, the present invention is also operable with constant-speed feed of the electrode. It will be understood that, if the tool electrode is fed at a constant rate in the direction of the workpiece, an optimum gap condition can be maintained with increasing machining surface area only by a proportionate increase in the machining current and, consequently, the maintenance of constant current density. Circuitry for this purpose is illustrated in FIGS. 4 and 5.

Figure 4:
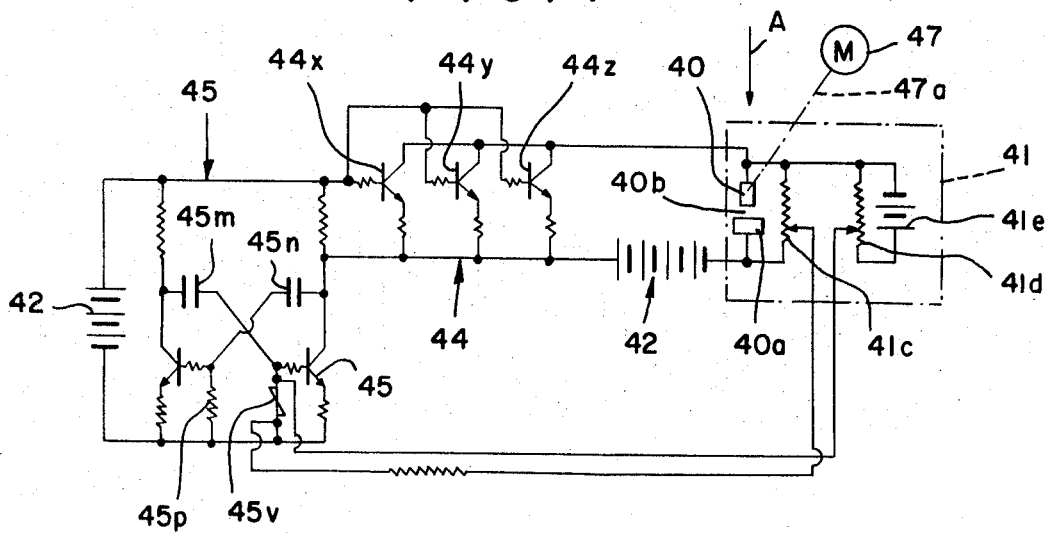
FIGS. 4 and 5 are circuits embodying other principles of the present invention.

In the system of FIG. 4, for example, the electrode 40 is fed in the direction of the workpiece 40a (arrow A) by a constant-speed motor 47 linked with the electrode 40 by a threaded spindle or rack-and-pinion coupling as represented at 47a. As described in my prior applications mentioned earlier, the power supply may include a D.C. source 42 and a bank of power transistors 44 in place of a storage capacitor. In this circuit, the battery 42 is connected in series with the emitter-connector terminals of the power transistors 44x, 44y and 44z, in parallel with one another, and the electrodes 40 and 40a across the machining gap 40b. When the transistors 44x, 44y and 44z are triggered into a conductive condition, the machining pulse is applied across the electrode arrangement 40, 40a and 40b. The timing circuit for controlling the triggering of the transistors 44x, 44y and 44z includes a multivibrator 45 whose transistors 45x and 45y are reciprocably connected via the timing-control networks constituted of capacitors 45m, 45n and resistors 45p and 45v. The latter is a varistor whose resistance is controlled by the potential applied thereacross. A detector network 41 responding to changes in gap condition, is connected across the varistor 45v to increase the pulse duration with increasing machining surface area as an electrode 40 is driven at constant speed toward the workpiece 40a. To this end, the gap-spacing detecting potentiometer 41c has a wiper constituting one output terminal of the sensing circuit 41 while a reference voltage is supplied by the wiper of a potentiometer 41d connected across the battery 41e. The difference in potential constituting the output of this detector is thus proportional to the deviation of the gap width from its desired dimensions and, therefore, represents the change in effective machining area when the electrode is advanced at constant speed. Results similar to those of the system of FIG. 2 are obtained.

Figure 5:
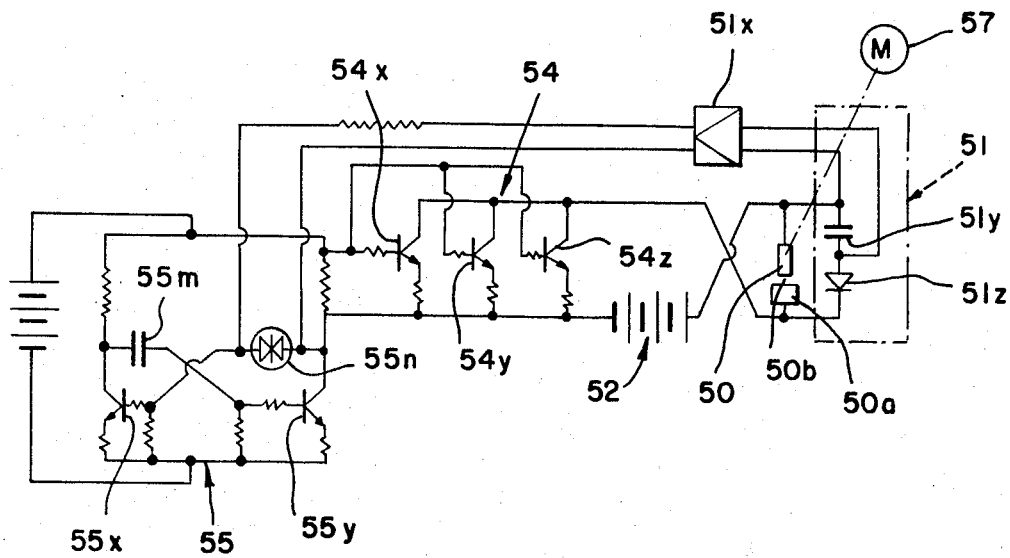

FIG. 5 represents a generally similar circuit in which the electrode 50 is advanced at constant speed toward the workpiece 50a and the machining gap 50b is maintained constant by increasing the machining current to maintain constant current density. In this system, the multivibrator timer 55 includes, as one of the timing-controlling capacitors 55m, 55n of the transistors 55x, 55y a varactor whose capacitance is regulated by the potential thereacross as applied by an amplifier 51x of the sensing circuit 51. The sensing circuit here includes a capacitor 51y in series with a diode 51z forming an integrating circuit energizing the amplifier 51x. A motor 57 drives the electrode 50 at constant speed while the machining current is delivered by battery 52 through the parallel-connected transistors 54x, 54y and 54z of a solid-state switching circuit 54 triggered by the multivibrator timer 55.

The improvement described and illustrated is believed to admit of many modifications within the ability of persons skilled in the art, all such modifications being considered within the spirit and scope of the invention.

I claim:

1. In a method of machining a workpiece constituting a workpiece electrode by advancing a tool electrode with respect to the workpiece electrode and maintaining a machining gap therebetween flooded with a dielectric coolant, by applying electric pulses across the electrodes to effect electroerosive spark discharge along the workpiece surface juxtaposed with the tool electrode, whereby the surface area over which machining occurs varies during the process, the improvement which comprises the steps of continuously deriving an electrical signal in response to the maintenance of said gap and representing variation in the surface area over which machining occurs; and automatically controlling the mean electric current supplied to said electrodes in the course of advance of said tool electrode to maintain the current density along said machining surface substantially constant while the area of the machining surface juxtaposed with the tool electrode is varied.

2. In a method of machining a workpiece constituting a workpiece electrode by advancing a tool electrode with respect to the workpiece electrode and maintaining a machining gap therebetween flooded with a dielectric coolant, by applying electric pulses across the electrodes to effect electroerosive spark discharge along the workpiece surface juxtaposed with the tool electrode, the improvement which comprises the step of controlling the mean electric current supplied to said electrodes in the course of advance of said tool electrode to maintain the current density along said machining surface substantially constant while the area of the machining surface juxtaposed with the tool electrode is varied, the current density at said machining surface being maintained substantially constant by advancing said tool electrode at a substantially constant rate, detecting the width of said gap, and varying the current delivered to said electrodes in accordance with the detected gap width so as to maintain said gap substantially constant.

3. The method defined in claim 2 wherein the current supplied to said electrodes is applied thereto in the form of a train of current pulses, further comprising the step of varying a parameter of said train of pulses in dependence upon the variation in gap width attributable to change in the area of the machining surface exposed to said tool electrode, said variation of said parameter including one of the following steps:

(a) varying the duration of the pulses of said train while maintaining the pulse frequency substantially constant;

(b) varying the off-time of the pulses of said train while maintaining the pulse frequency substantially constant;

(c) varying the duration of the pulses of said train while maintaining the off-time of said pulses substantially constant; and (d) varying the off-time of said pulses of said train while maintaining the duration of said pulses substantially constant.

4. In a method of machining a workpiece constituting a workpiece electrode by advancing a tool electrode with respect to the workpiece electrode and maintaining a machining gap therebetween flooded with a dielectric coolant, by applying electric pulses across the electrodes to effect electroerosive spark discharge along the workpiece surface juxtaposed with the tool electrode, the improvement which comprises the step of controlling the mean electric current supplied to said electrodes in the course of advance of said tool electrode to maintain the current density along said machining surface substantially constant while the area of the machining surface juxtaposed with the tool electrode is varied, said current density being maintained substantially constant along said machining surface by advancing said tool electrode so as to maintain the width of said gap substantially constant, detecting the rate of advance of said tool electrode, and varying the current supplied to said electrodes in accordance with the detected rate of advance of said tool electrode.

5. The method defined in claim 4 wherein the current supplied to said electrodes is applied thereto in the form of a train of current pulses, further comprising the step of varying a parameter of said train of pulses in dependence upon the rate of advance of said tool electrode, said variation of said parameter including one of the following steps:
  (a) varying the duration of the pulses of said train while maintaining the pulse frequency substantially constant;
  (b) varying the off-time of the pulses of said train while maintaining the pulse frequency substantially constant;
  (c) varying the duration of the pulses of said train while maintaining the off-time of said pulses substantially constant; and
  (d) varying the off-time of said pulses of said train while maintaining the duration of said pulses substantially constant.

6. In an apparatus for the electric-discharge machining of a conductive workpiece forming a workpiece electrode by advancing a tool electrode relatively to the workpiece electrode with fluctuating machining surface to maintain a machining gap flooded with a dielectric coolant, and by applying electric discharge pulses across said electrodes to electroerosively remove portions of the said surface of said workpiece electrode, the improvement which comprises circuit means continuously responsive to the maintenance of said gap for producing an output representing the change in area of said machining surface; and means responsive to said output and connected to said circuit means for automatically controlling the mean electric current applied to said electrodes to maintain the current density along said machining surface substantially constant in spite of changes in said area during advance of said tool electrode.

7. In an apparatus for the electric-discharge machining of a conductive workpiece forming a workpiece electrode by advancing a tool electrode relatively to the workpiece electrode with fluctuating machining surface, across a machining gap flooded with a dielectric coolant, by applying electric discharge pulses across said electrodes to electroerosively remove portions of the said surface of said workpiece electrode, the improvement which comprises means responsive to the area of said machining surface for controlling the mean electric current applied to said electrodes to maintain the current density along said machining surface substantially constant in spite of changes in said area during advance of said tool electrode, said means including a constant-speed drive connected with said tool electrode, circuit means responsive to at least one electrical parameter of said gap for detecting variations in said gap attributable to changes in said area, and power supply means controlled by said circuit means for maintaining said current density substantially constant.

8. The apparatus defined in claim 7 wherein said power supply means includes a source of electric pulses connected across said electrodes and timer means controlled by said circuit means for triggering said pulses.

9. The apparatus defined in claim 8 wherein said timer means is a multivibrator having resistive and capacitive impedances regulating the pulse duration, at least one of said impedances having a value regulatable by an electric signal, said circuit means being connected across said one of said impedances for applying said signal thereto.

10. The apparatus defined in claim 9 wherein said one of said impedances is a varactor.

11. The apparatus defined in claim 9 wherein said one of said impedances is a varistor.

12. The apparatus defined in claim 9 wherein said source of electric pulses is a plurality of solid-state switches connected in parallel with one another and in series with a D.C. source and said electrodes, said switches being simultaneously triggered by said multivibrator.

13. In an apparatus for the electric-discharge machining of a conductive workpiece forming a workpiece electrode by advancing a tool electrode relatively to the workpiece electrode with fluctuating machining surface, across a machining gap flooded with a dielectric coolant, by applying electric discharge pulses across said electrodes to electroerosively remove portions of the said surface of said workpiece electrode, the improvement which comprises means responsive to the area of said machining surface for controlling the mean electric current applied to said electrodes to maintain the current density along said machining surface substantially constant in spite of changes in said area during advance of said tool electrode, said means including servomotor means connected with said electrode and responsive to the width of said gap for maintaining said gap width substantially constant, circuit means responsive to the rate of advance of said tool electrode, and power supply means controlled by said circuit means for varying the current applied to said electrodes in accordance with the rate of advance of said tool electrode as detected by said circuit means.

14. The apparatus defined in claim 13 wherein said circuit means includes a rate generator coupled with said servomotor means for generating a signal in dependence with the change of area of said machining circuit, said power supply means including means controlled by said signal and coupled with said circuit means.

15. The apparatus defined in claim 14 wherein said power supply means includes a source of alternating current, rectifier means interposed between said source and said electrodes, and a saturable reactor connected between said source and said rectifier means, said saturable reactor having a control winding energizable with said signal and coupled with said circuit means.

16. The apparatus delned in claim 14 wherein said power supply means includes a source of direct current, electronically triggerable switch means interposed between said source and said electrodes for delivering a train of machining pulses thereto, and timer means connected with said switch means for triggering same, said timer means being connected with said circuit means for varying the pulse duration to control the main current delivered to said electrodes.

17. The apparatus defined in claim 16 wherein said switch means is a solid-state controlled rectifier having a gate, said timer means including a unijunction transistor oscillator coupled to said gate and a variable impedance element in said oscillator energized by said circuit means with said signal.

18. The apparatus defined in claim 17 wherein said element is a transistor.

19. The apparatus defined in claim 16, further comprising means for detecting the amplitude of the current delivered to said electrodes and connected with said circuit means for operating said timer means jointly therewith.

20. The apparatus defined in claim 16 wherein said rate generator is a tachometer.

References Cited
UNITED STATES PATENTS

| | | |
|---|---|---|
| 2,813,966 | 11/1957 | Matulaitis. |
| 3,148,446 | 9/1964 | Celovsky. |
| 3,264,517 | 8/1966 | Ullman et al. |

RALPH F. STAUBLY, Primary Examiner

U.S. Cl. X.R.

204—143

REEXAMINATION CERTIFICATE (722nd)

United States Patent [19]

Inoue

[11] B1 3,536,881

[45] Certificate Issued    Jul. 14, 1987

[54] CONSTANT CURRENT DENSITY EDM SYSTEM CAPABLE OF AUTOMATICALLY RESPONDING TO CHANGING MACHINING AREA

[75] Inventor: Kiyoshi Inoue, Tokyo, Japan

[73] Assignee: IJR Inc., Yokohama, Japan

Reexamination Request:
No. 90/001,001, May 1, 1986

Reexamination Certificate for:
| | |
|---|---|
| Patent No.: | 3,536,881 |
| Issued: | Oct. 27, 1970 |
| Appl. No.: | 762,580 |
| Filed: | Sep. 25, 1968 |

Related U.S. Application Data

[63] Continuation-in-part of Ser. No. 682,824, Nov. 14, 1967, which is a continuation-in-part of Ser. No. 493,473, Oct. 6, 1965, Pat. No. 3,360,683.

[30] Foreign Application Priority Data

Oct. 21, 1967 [JP] Japan .................... 42/67,723
Nov. 27, 1967 [JP] Japan .................... 42/76,040

[51] Int. Cl.$^4$ ............... B23P 1/04; B23P 1/08

[52] U.S. Cl. .................. 219/69 G; 219/69 R; 204/129.25; 204/129.43; 204/228

[58] Field of Search ............. 219/69 P, 69 C, 69 S, 219/69 G, 69 M, 69 E; 204/129.1, 228, 129.25, 129.43

[56] References Cited

U.S. PATENT DOCUMENTS

| | | | |
|---|---|---|---|
| 2,813,966 | 11/1957 | Matulaitis | 219/69 |
| 2,827,427 | 3/1958 | Barry et al. | 204/143 |
| 3,148,446 | 9/1964 | Celovsky | 29/557 |
| 3,264,517 | 8/1966 | Ullman et al. | 315/174 |
| 3,365,381 | 1/1968 | Fromson | 204/143 |
| 3,443,153 | 5/1969 | Berghausen | 315/224 |

FOREIGN PATENT DOCUMENTS

1198 of 1963 Japan .

*Primary Examiner*—M. H. Paschall

[57] ABSTRACT

Power-supply arrangement for electric-discharge machining apparatus in which impulsive current is applied to an electrode advanced in the direction of a workpiece while a dielectric coolant floods in the gap, the circuit having means for controlling the main current delivered to the electrode so as to maintain the current density at the machining surface constant in spite of variations in the workpiece area subjected to electric-discharge machining in the course of the electrode movement.

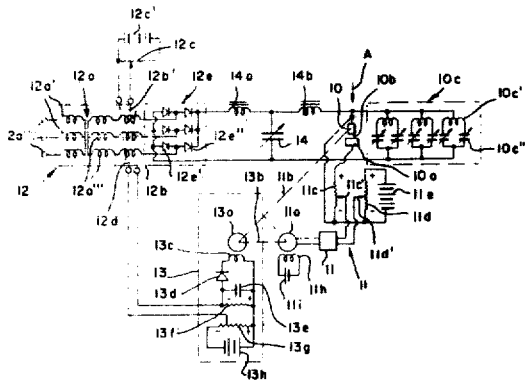

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *